(12) United States Patent
Choi et al.

(10) Patent No.: US 9,285,843 B2
(45) Date of Patent: Mar. 15, 2016

(54) ELECTRONIC DEVICE

(71) Applicant: Samsung Electronics Co., Ltd, Gyeonggi-do (KR)

(72) Inventors: Jong-Min Choi, Gyeonggi-do (KR); Soon-Woong Yang, Gyeonggi-do (KR); Hong-Moon Chun, Gyeonggi-do (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 107 days.

(21) Appl. No.: 14/146,620

(22) Filed: Jan. 2, 2014

(65) Prior Publication Data

US 2014/0218878 A1 Aug. 7, 2014

(30) Foreign Application Priority Data

Feb. 7, 2013 (KR) .................. 10-2013-0013989

(51) Int. Cl.
*G06F 1/16* (2006.01)
*H01M 2/10* (2006.01)
*G06F 1/18* (2006.01)
*H04M 1/02* (2006.01)

(52) U.S. Cl.
CPC .............. *G06F 1/188* (2013.01); *G06F 1/1635* (2013.01); *H01M 2/1022* (2013.01); *H01M 2/1066* (2013.01); *H04M 1/0262* (2013.01)

(58) Field of Classification Search
CPC .... G06F 1/1635; G06F 1/188; H01M 2/1022; H01M 2/1066; H04M 1/0262
USPC .................. 429/96, 100; 361/679.55–679.59, 361/679.01–679.45
See application file for complete search history.

(56) References Cited

U.S. PATENT DOCUMENTS

| | | | |
|---|---|---|---|
| 4,777,563 A * | 10/1988 | Teraoka ............. | G06F 15/0216 200/5 A |
| 6,218,041 B1 * | 4/2001 | Barbier .............. | H01M 2/0215 429/121 |
| 7,077,692 B2 * | 7/2006 | Chintala ....................... | 439/500 |
| 7,933,123 B2 * | 4/2011 | Wang et al. .............. | 361/679.56 |
| 8,357,460 B2 | 1/2013 | Van Schyndel et al. | |
| 8,467,195 B2 | 6/2013 | Zaitsu | |
| 2009/0175018 A1 * | 7/2009 | Zaitsu ................... | H04M 1/185 361/800 |
| 2011/0014942 A1 * | 1/2011 | Van Schyndel ..... | H01M 2/1094 455/550.1 |
| 2011/0129713 A1 | 6/2011 | Liang | |
| 2013/0273981 A1 | 10/2013 | Liu | |
| 2013/0286560 A1 * | 10/2013 | Liu ..................... | H01M 2/1066 361/679.01 |

FOREIGN PATENT DOCUMENTS

| | | |
|---|---|---|
| CN | 202617551 | 12/2012 |
| KR | 10-2004-0110874 | 12/2004 |
| KR | 10-2005-0091569 | 9/2005 |
| KR | 10-2005-0103521 | 10/2005 |
| KR | 10-2007-0003473 | 1/2007 |

OTHER PUBLICATIONS

Extended European Search Report dated Sep. 22, 2014 in connection with European Patent Application No. 13189349.7; 14 pages.

(Continued)

*Primary Examiner* — Nidhi Thaker

(57) ABSTRACT

An electronic device includes a housing defining an exterior of the electronic device, the housing accommodating a main board, a metal plate coupled to the housing, and a battery attached to the metal plate, the battery being electrically connected to the main board.

17 Claims, 18 Drawing Sheets

(56) References Cited

OTHER PUBLICATIONS

Patent Examination Report No. 1 dated Feb. 7, 2015 in connection with Australian Patent Application No. 2013251253; 3 pages.

Partial European Search Report dated Jul. 7, 2014 in connection with European Patent Application No. 13189349.7, 5 pages.

Australian Office Action dated Nov. 27, 2015 in connection with Australian Patent Application No. 2013251253; 3 pages.

* cited by examiner ns of the electronic device 1500.

ELECTRONIC DEVICE

PRIORITY

The present application is related to and claims priority under 35 U.S.C. §119 to an application filed in the Korean Intellectual Property Office on Feb. 7, 2013 and assigned Serial No. 10-2013-0013989, the contents of which are incorporated herein by reference.

TECHNICAL FIELD

The present disclosure relates generally to an electronic device.

BACKGROUND

Today, electronic devices for mobile phones, portable multimedia players (PMPs), personal digital assistants (PDAs), and the like are coming into wide use as the necessities in modern society. Such electronic devices use batteries as a power source. A user can easily detach the battery from the electronic device. Also, as portable electronic devices become popular, the need for greater usage time of the electric devices is increasing. Also, as the electronic devices are smart, they are increasingly used for the Internet, applications, and the like. In addition, as display size and resolution increases, and central processing units improve in performance, power consumption in battery-operated electronic devices increases. Because of these circumstances, high-capacity batteries are being produced. Also, as the number of battery cells increases, battery volume increases when compared to that according to a related art. As a result, a battery with an increasing size has a retrogressive effect on the slimness of the electronic device. Lately, a method for permanently fixing a battery to an electronic device without being detached from the electronic device is used to reduce a thickness of the electronic device. For example, in the method for permanently fixing the battery to the electronic device, a coating material and plastic structure for protecting a battery cell are removed, and only the battery cell is mounted on the electronic device as it is.

FIG. 15 is a view illustrating a battery mount structure of an electronic device according to a related art.

Referring to FIG. 15, an electronic device 1500 includes a case on which a plurality of electronic components are mounted and defining an exterior. The case includes a front case 1510 disposed on a front side thereof and a rear case 1540 disposed on a rear side thereof. A battery 1520 is disposed in a space defined by coupling the front case 1510 to the rear case 1540. Particularly, the rear case can be detached by a user. Even though the rear case 1540 is separated, the battery can be covered by an injection-molded plastic body 1530 and thus be protected against the outside. The injection-molded plastic body 1530 should be hard so as to protect the battery 1520 against the outside. However, to secure the hardness of the injection-molded plastic body 1530, the injection-molded plastic body 1530 should increase in thickness. However, this result may go against its original intent for reducing a thickness of the electronic device 1500.

SUMMARY

To address the above-discussed deficiencies of the related art, it is a primary object of the present application is to provide an electronic device in which a battery is attached to a metal plate to protect the battery against the outside and realize greater slimness of the electronic device, and the metal plate is fixed to a housing defining an exterior of the electronic device.

Another object of the present application is to provide an electronic device having an improved coupling structure through which a coupling force between a metal plate to which a battery is attached and a housing defining an exterior is improved.

Another object of the present application is to provide an electronic device including a metal plate that is attached to a battery to dissipate heat generated from the battery, thereby stabilizing the battery.

Another object of the present application is to provide an electronic device including a metal plate that shields noise generated from the electronic device or noise introduced from the outside.

According to an embodiment of the present application, an electronic device includes: a housing defining an exterior of the electronic device, the housing accommodating a main board; a metal plate coupled to the housing; and a battery attached to the metal plate, the battery being electrically connected to the main board.

According to another embodiment of the present application, an electronic device includes: a front housing disposed on a front side of the electronic device; a rear housing coupled to the front housing to provide a space in which a main board is accommodated; a metal plate disposed between the front housing and the rear housing and to which a battery electrically connected to the main board is attached, the metal plate being disposed on a side of the main board so that at least one portion of the metal plate overlaps or does not overlap the main board; and a battery cover detachably disposed on the rear housing, wherein the metal plate includes: an attachment part to which the battery is attached; and a plurality of coupling parts laterally extending to define a circumference, the circumference of the attachment part having at least one bent portion, the plurality of coupling parts being fitted between the front housing and the rear housing, wherein the attachment part is fitted into an opening defined in the rear housing and exposed through the opening, and when the rear housing and the battery cover are coupled to each other, the attachment part is covered by the battery cover, and at least one of the plurality of coupling parts is coupled to the front and rear housings by using a screw.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
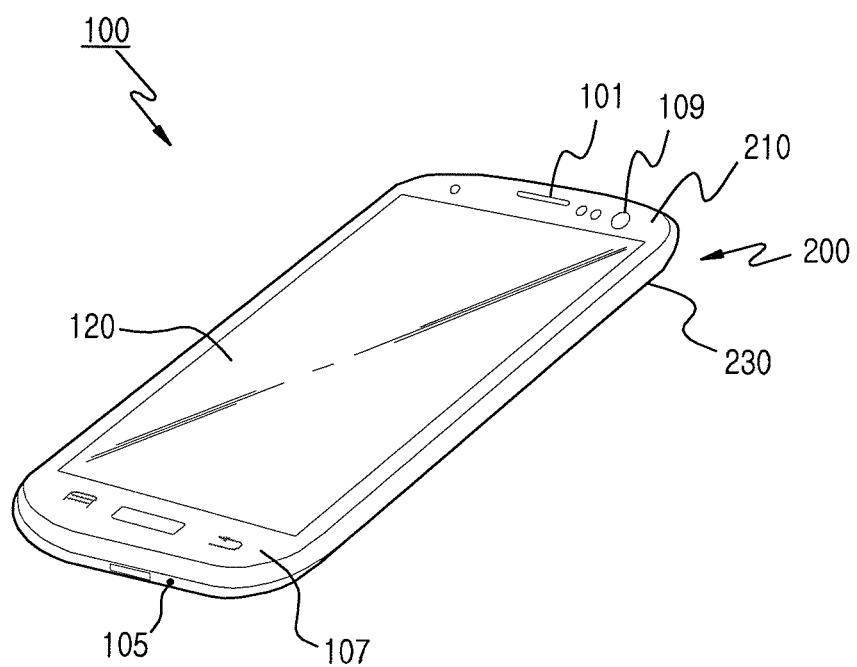
FIG. 1 is a perspective view of an electronic device according to certain embodiments.

FIGS. 1 through 14C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Since the present disclosure may have diverse modified embodiments, certain embodiments are illustrated in the drawings and are described in the detailed description of the invention. However, this does not limit the present invention within specific embodiments and it should be understood that the present disclosure covers all the modifications, equivalents, and replacements within the idea and technical scope of the present disclosure.

It will be understood that although the terms of first and second are used herein to describe various elements, these elements should not be limited by these terms. Terms are only used to distinguish one component from other components. Therefore, a component referred to as a first component in one embodiment can be referred to as a second component in another embodiment.

It will be understood that when an element is referred to as being "connected" to the other element, it can be directly connected to the other element, or intervening elements may also be present. On the other hand, it will be understood that when an element is referred to as being "directly connected" to the other element, intervening elements may not be present.

The terms used in this specification are merely used for explaining specific embodiments, and thus the present disclosure should not be limited by these terms. The terms of a singular form may include plural forms unless referred to the contrary. The meaning of "include," "comprise," "including," or "comprising," specifies a feature, a figure, a step, an operation, an element, a component, or a combination thereof but does not exclude other features, figures, steps, operations, elements, components, or combinations thereof.

Certain embodiments of the present disclosure will be described herein below with reference to the accompanying drawings. In the following description, specific details such as concrete process flow are described to provide more general understandings of the present disclosure. Also, the details are used only for explain a specific exemplary embodiment while not limiting the present disclosure. Moreover, detailed descriptions related to well-known functions or configurations will be ruled out in order not to unnecessarily obscure subject matters of the present disclosure.

An electronic device providing a metal plate that protects a battery and is coupled to a housing is described.

Figure 2:
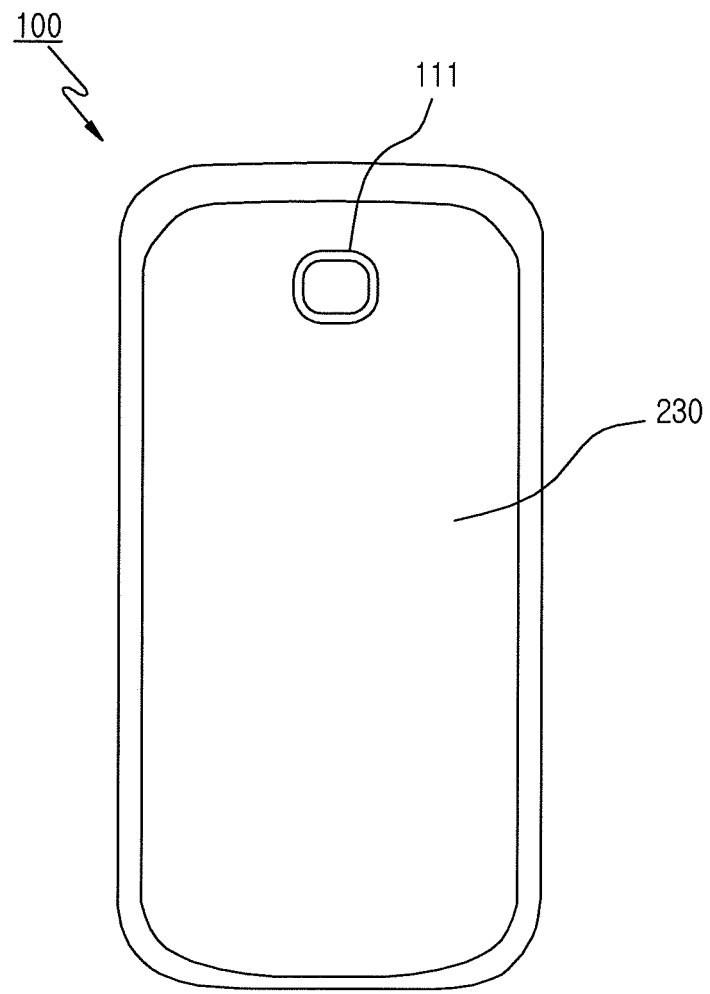
FIG. 2 is a back view of the electronic device according to certain embodiments.

FIG. 1 is a perspective view of an electronic device according to certain embodiments, and FIG. 2 is a back view of the electronic device according to certain embodiments. Referring to FIGS. 1 and 2, an electronic device 100 can include a speaker 101, a touch screen 120, a microphone 105, a keypad 107, a front camera 109, a rear camera 111, and a housing 200. The speaker 101 is disposed on a front side of the electronic device 100. The speaker 101 converts an electrical signal into an audible frequency to output a sound. The touch screen 120 is disposed under the speaker 101 to display an image and receive a touch input.

The microphone 105 is disposed under the touch screen 120 to convert a sound wave transmitted from persons or other sound sources into an electrical signal. Input buttons are disposed on the keypad 107. The keypad 107 is disposed under the touch screen 120. The front camera 109 and the rear camera 111 are respectively disposed on front and rear sides of the electronic device 100 to perform camera functions such as picture and video clip and recoding.

The electronic device 100 includes the housing 200 defining an exterior. The above-described components can be accommodated in an accommodation space of the housing 200. The housing 200 can include a front housing 210 and a rear housing 220. A battery cover (i.e., a rear cover) 230 is attached or detached to the rear housing 220.

Figure 3:
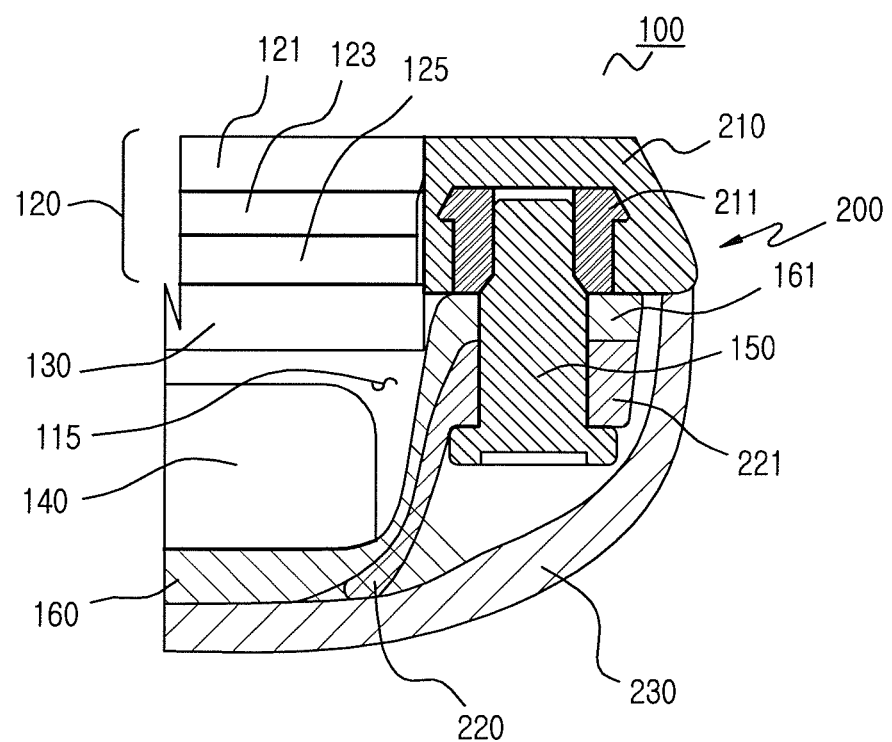
FIG. 3 is an internal cross-sectional view of the electronic device according to certain embodiments.

FIG. 3 is an internal cross-sectional view of the electronic device according to certain embodiments. Referring to FIG. 3, the front housing 210 is coupled to the rear housing 220 to define an accommodation space 115 opened towards the front of the electronic device 100. The touch screen 120, a main board 130, a battery 140, and a metal plate 160 are accommodated in the accommodation space 115. The main board 130 is disposed between the touch screen 120 and the battery 140.

The main board 130 can be a board on which a basic circuit and a plurality of electronic components are mounted. The main board 130 can set an execution environment of the electronic device 100 and maintain information with respect to the electronic device 100 so that the electronic device 100 stably operates, and data inputs and outputs of all parts of the electronic device 100 are smoothly executed.

The touch screen 120 includes a window 121, a touch panel 123, and a display 125. The window 121 is transparent and exposed to the front side of the electronic device 100. An image displayed on the display 125 is shown through the window 121. The touch panel 123 is held between the window 121 and the display 125. Also, the touch panel 123 can include a resistive touch panel and a capacitive touch panel.

The battery 140 is electrically connected to the main board 130 to supply a necessary power into the electronic device 200. The battery 140 is attached to the metal plate 160 by using an adhesive unit such as a tape and bond. The metal plate 160 will be described later.

The front housing 210 includes a boss 211 to be coupled to the rear housing 220. The boss 211 includes a screw coupling part in which a screw hole to be coupled to a screw 150 is defined. The screw coupling part is formed of a metal and is formed within the boss 211 while injection molding is performed.

The metal plate 160 is disposed between the front housing 210 and the rear housing 220. The battery 140 is attached to the metal plate 160, and a portion of the metal plate 160 is fitted into an opening of the rear housing 220. The metal plate 160 has a circumference having a container shape with a space for accommodating the battery 140 and extending laterally, i.e., a coupling part 161. The coupling part 161 of the metal plate 160 can be fitted between the front housing 210 and the rear housing 220. Alternatively, as shown in FIG. 3, the coupling part 161 can be fitted between the front housing 210 and the rear housing 220 and then be coupled together with the front housing 210 and the rear housing 220 by using the screw 150. The rear housing 220 has a boss coupling hole 221 coupled to the boss 211 of the front housing 210 by using the screw 150. The screw 150 passes through the boss coupling hole 221 of the rear housing 220. Then, the screw 150 passes through the coupling part 161 of the metal plate 160 and is coupled to the boss 211 of the front housing 210. Thus, the front housing 210, the metal plate 160, and the rear housing 220 are can be integrated with each other.

The battery cover 230 is disposed on the rear side of the electronic device 100 and is detachably disposed on the rear housing 220. When the battery cover 230 is separated from the rear housing 220, the configuration in which the metal plate 160 is fitted into the opening of the rear housing 220 is shown.

As described above, the metal plate 160 has a container shape for accommodating the battery 140 and includes the coupling part 161 fitted between the front housing 210 and the rear housing 220. The coupling part 161 of the metal plate 160 is disposed on a circumference 165 extending laterally from an attachment part 167. The coupling part 161 of the metal plate 160 can be divided into two parts. The coupling part 161 of the metal plate 160 includes a flange part 162 fitted between the front housing 210 and the rear housing 220 and a screw coupling part (see reference numeral 163 of FIG. 5) fitted between the front housing 210 and the rear housing 220 and then coupled together with the front housing 210 and the rear housing 220. The coupling part 161 of the metal plate 160 can extend laterally in a method in which an end of the circumference 165 is bent at least one time, i.e., by using a hemming.

The metal plate 160 can be molded by using a metal such as aluminum, stainless steel, and the like. Also, post-processing processes such as thermal treating and hairline processes can be additionally performed on the metal plate 160. The metal plate 160 has a relatively high hardness compared to that of an injection-molded plastic body even though the metal plate 160 has a thickness less than that of the injection-molded plastic body. Thus, the metal plate 160 can be effective for protecting the battery 140 against the outside. Also, the metal plate 160 can have relatively superior thermal conductivity compared to that of the injection-molded plastic body. Thus, the metal plate 160 can effectively dissipate heat from the battery 140. Also, the metal plate 160 has electrical conductivity. Thus, the metal plate 160 can shield noise generated from electronic components such as the main board 130 or noise introduced from the outside. Particularly, at least one portion of the metal plate 160 overlaps the main board 130. Thus, the metal plate 160 can prevent the noise generated from the main board 130 form leaking to the outside and prevent the external noise from being introduced into the main board 130 to prevent the noise shielding from being deteriorated. Also, the coupling part 161 of the above-described metal plate 160 can be expanded up to a region for shielding the noises, and thus is not limited in size and shape thereof. Also, the metal plate 160 can be electrically connected to a ground of the main board 130. Thus, the metal plate 160 can effectively improve noise shielding effects and antenna performance.

Figure 4:
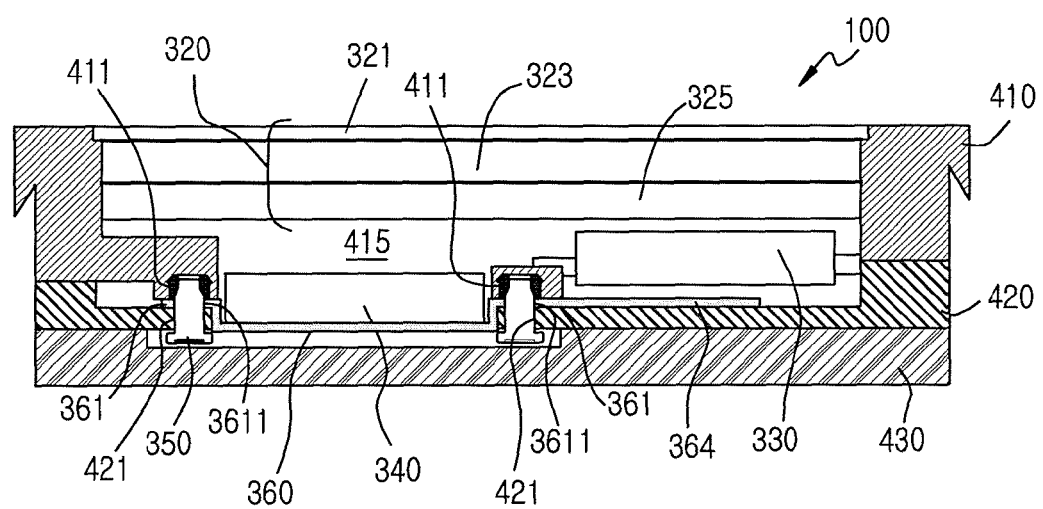
FIG. 4 is an internal cross-sectional view of an electronic device according to certain embodiments.

FIG. 4 is an internal cross-sectional view of an electronic device according to certain embodiments. Referring to FIG. 4, a front housing 410 is coupled to a rear housing 420 to define an accommodation space 415 opened in a front direction of an electronic device 100. A touch screen 320, a main board 330, a battery 340, and a metal plate 360 are accommodated in the accommodation space 415. The main board 330 and the battery 340 are disposed parallel to each other, but do not overlap each other. The touch screen 320 is disposed above the main board 330 and the battery 340. The main board 330 can be a board on which a basic circuit and a plurality of electronic components are mounted. The main board 330 can set an execution environment of the electronic device 100 and maintain information with respect to the electronic device 100 so that the electronic device 100 stably operates, and data inputs and outputs of all parts of the electronic device 100 are smoothly executed.

The touch screen 320 includes a window 321, a touch panel 323, and a display 325. The window 321 is transparent and exposed to the front side of the electronic device 100. An image displayed on the display 325 is shown through the window 321. The touch panel 323 is held between the window 321 and the display 325. Also, the touch panel 323 can include a resistive touch panel and a capacitive touch panel.

The battery 340 is electrically connected to the main board 330 to supply necessary power into the electronic device 100. The battery 340 is attached to the metal plate 360 by using an adhesive unit such as a tape and bond. The metal plate 360 will be described later.

The front housing 410 includes a boss 411 to be coupled to the rear housing 420. The boss 411 includes a screw coupling part in which a screw hole to be coupled to a screw 350 is defined. The screw coupling part is formed of a metal and is foil lied within the boss 411 while injection molding is performed.

The metal plate 360 is disposed between the front housing 410 and the rear housing 420. The battery 340 is attached to the metal plate 360, and a portion of the metal plate 360 is fitted into an opening of the rear housing 420. The metal plate 360 has a circumference having a container shape with a space for accommodating the battery 340 and extending laterally, i.e., a coupling part 361. The coupling part 361 of the metal plate 360 can be fitted between the front housing 410 and the rear housing 420. Alternatively, as shown in FIG. 4, the coupling part 361 can be fitted between the front housing 410 and the rear housing 420 and then be coupled together with the front housing 410 and the rear housing 420 by using the screw 350. The rear housing 420 has a boss coupling hole 421 coupled to the boss 411 of the front housing 410 by using the screw 350. The screw 350 passes through the boss coupling hole 421 of the rear housing 420. Then, the screw 350 passes through a screw coupling part 3611 of the coupling part 361 of the metal plate 360 and is coupled to the boss 411 of the front housing 410. Thus, the front housing 410, the metal plate 360, and the rear housing 420 can be integrated with each other.

A battery cover 430 is disposed on the rear side of the electronic device 100 and is detachably disposed on the rear housing 420. The battery cover 430 can be separated from the rear housing 420. The configuration in which the metal plate 360 is fitted into the opening of the rear housing 420 is shown.

As described above, the metal plate 360 has a container shape for accommodating the battery 340 and includes the coupling part 361 fitted between the front housing 410 and the rear housing 420. The coupling part 361 of the metal plate 360 is disposed on a circumference extending laterally from an attachment part 367. The coupling part 361 of the metal plate 360 can be divided into two parts. The coupling part 361 of the metal plate 360 includes a flange part 362 fitted between the front housing 410 and the rear housing 420 and a screw coupling part 3611 fitted between the front housing 410 and the rear housing 420 and then coupled together with the front housing 410 and the rear housing 420 by using the screw 350. The coupling part 361 of the metal plate 360 extends laterally by using the hemming method as described above.

The metal plate 360 can be molded by using a metal such as aluminum, stainless steel, and the like. Also, post-processing processes such as painting, heat treatment, and hairline can be additionally performed on the metal plate 360. The metal plate 360 has relatively high hardness compared to that of an injection-molded plastic body even though the metal plate 360 has a thickness less than that of the injection-molded plastic body. Thus, the metal plate 360 can be effective for protecting the battery 340 against the outside. Also, the metal plate 360 can have relatively superior thermal conductivity than that of the injection-molded plastic body. Thus, the metal plate 360 can effectively dissipate heat from the battery 340. Also, the metal plate 360 has electrical conductivity. Thus, the metal plate 360 can shield noise generated from electronic components such as the main board 330 or noise introduced from the outside. Particularly, at least one portion of the metal plate 360 extends to overlap the main board 330. Thus, an extension part 364 of the coupling part 361 of the metal plate 360 can prevent noise generated from the main board 360 from leaking to the outside and prevent external noise from being introduced into the main board 330 to prevent the noise shielding from deteriorating. Also, the metal plate 360 can be electrically connected to a ground of the main board 330. Thus, the metal plate 360 can effectively improve noise shielding effects and antenna performance.

Figure 5:
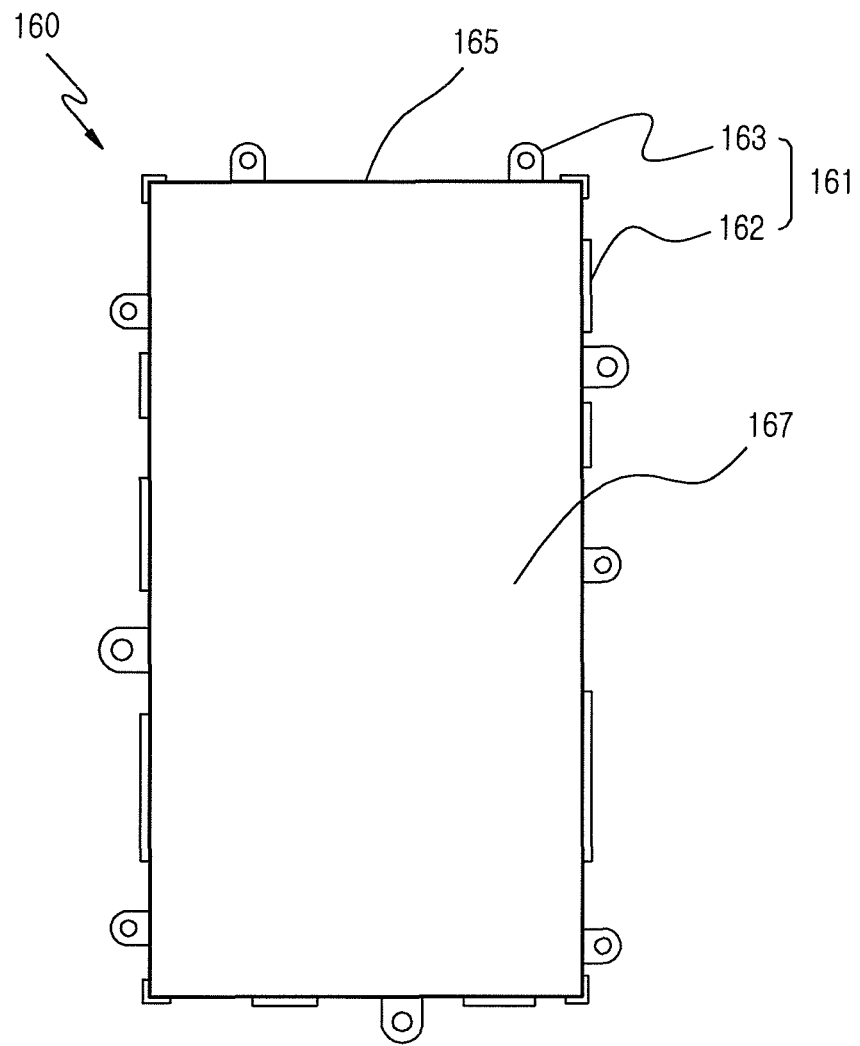
FIG. 5 is a plan view of a metal plate according to certain embodiments.

FIG. 5 is a plan view of a metal plate according to certain embodiments. Referring to FIG. 5, a metal plate 160 can have a plate shape that is molded by using a metal such as aluminum or stainless steel. The above-described metal plate 160 includes an attachment part 167 to which a battery 140 is attached and accommodating the battery 140 and a coupling part 161 extending laterally from the attachment part 167. The attachment part 167 of the metal plate 160 can provide a portion to which the battery 140 is attached. As described below, the attachment part 167 can have an uneven surface.

The coupling part 161 of the metal plate 160 is formed in a method in which a circumference 165 of the attachment part 167 is bent at least one time, i.e., by using a hemming. The coupling part 161 includes a flange part 162 disposed between the front housing 210 and the rear housing 220 and a screw coupling part 163 fitted between the front housing 210 and the rear housing 220 and screw-coupled together with the front housing 210 and the rear housing 220.

Figure 6:
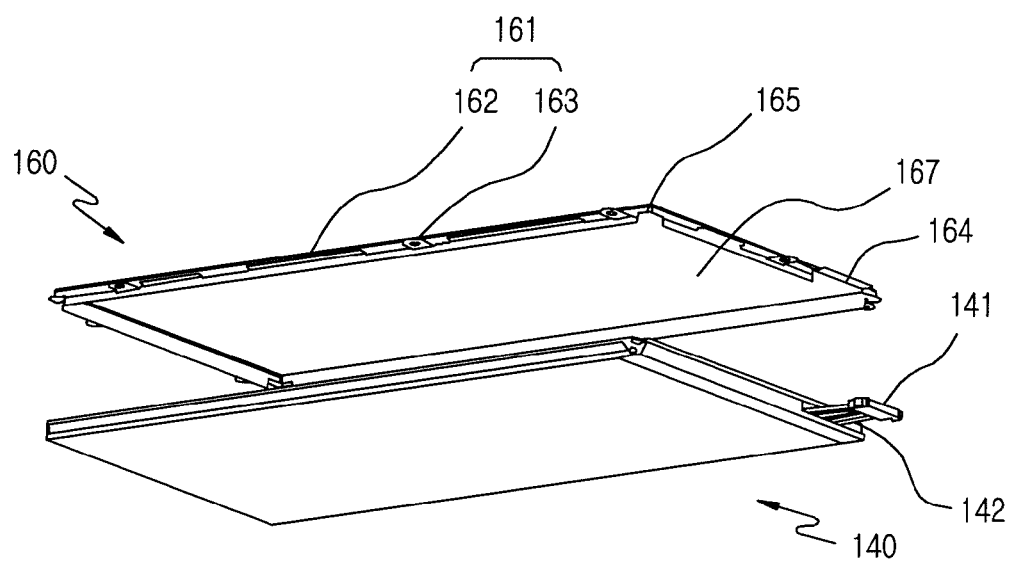
FIG. 6 is an exploded perspective view of the metal plate and a battery according to certain embodiments.
Figure 7:
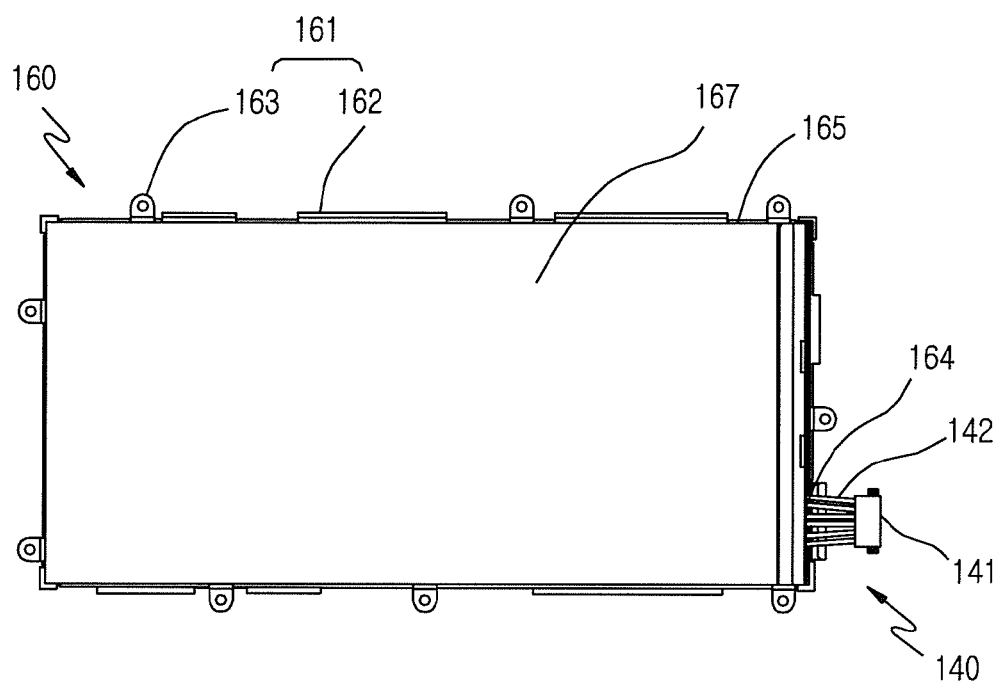
FIG. 7 is a perspective view illustrating a coupling between the metal plate and the battery according to certain embodiments.

FIG. 6 is an exploded perspective view of the metal plate and a battery according to certain embodiments, and FIG. 7 is a perspective view illustrating a coupling between the metal plate and the battery according to certain embodiments. Referring to FIGS. 6 and 7, the battery 140 adheres to an inner surface of the attachment part 167 of the metal plate by using an adhesive unit such as a tape or bond as a medium. The battery 140 includes an electrical connection unit 142 extending from a side thereof and a connector 141 connected to an end of the electrical connection unit 142. The electrical connection unit 142 can include a flexible printed circuit board (FPCB) or a cable. When the battery is attached to the attachment part 167 of the metal plate 160, the electrical connection unit 142 passes through an opening 164 defined in an end of the metal plate 160, and a connector 141 protrudes to the outside. Also, when the metal plate 160 to which the battery 140 is attached is coupled to the housing 200, the connector of the battery 40 is electrically connected to a connector of the main board 130.

Figure 8:
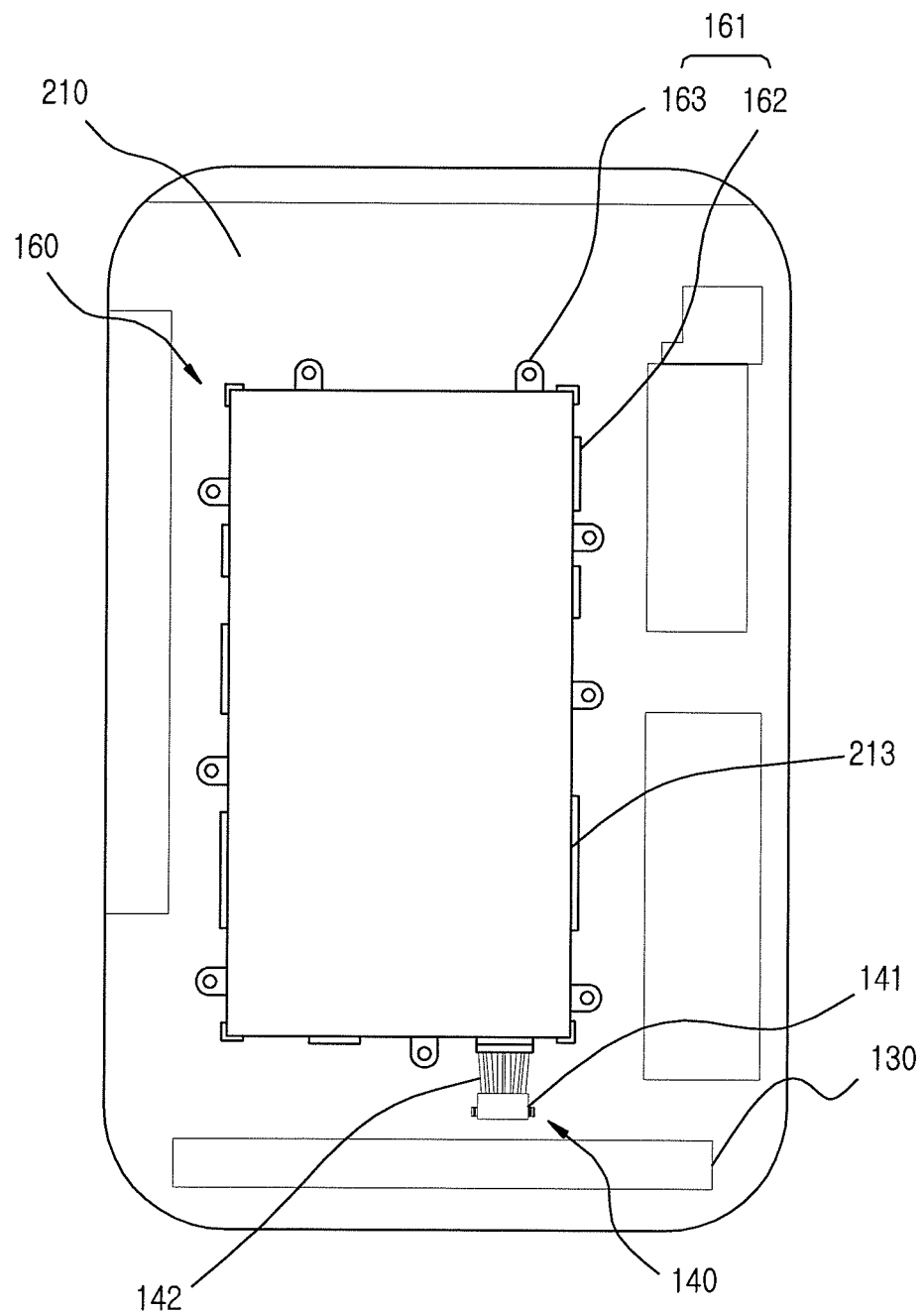
FIG. 8 is a view illustrating a state in which the metal plate with the battery attached thereto is seated on a front housing in the electronic device of FIG. 3 according to certain embodiments.

FIG. 8 is a view illustrating a state in which the metal plate with the battery attached thereto is seated on a front housing in the electronic device of FIG. 3 according to certain embodiments. Referring to FIG. 8, the front housing 210 has a groove 213. The metal plate to which the battery 140 is attached can be seated in the groove 213, and thus cannot be moved laterally. Also, as described above, the connector 141 of the battery 140 is electrically connected to the main board 130. Particularly, the metal plate 160 can be expanded up to the region for shielding the noise generated from the electronic components such as the main board 130.

Figure 9:
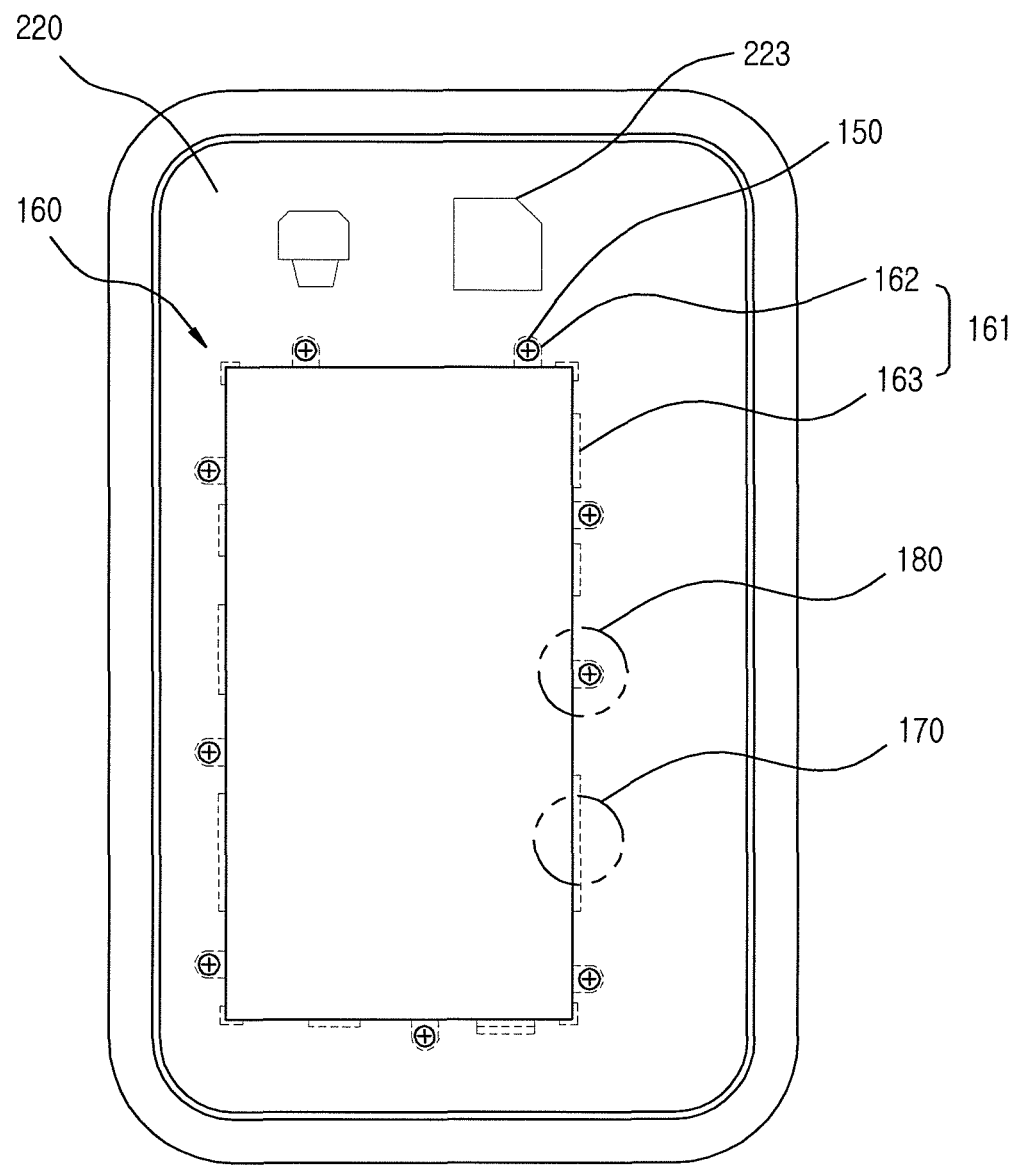
FIG. 9 is a view illustrating a state in which the metal plate with the battery attached thereto is seated on the front housing, and a rear housing is assembled with the front housing in the electronic device of FIG. 3 according to certain embodiments.

FIG. 9 is a view illustrating a state in which the metal plate with the battery attached thereto is seated on the front housing, and a rear housing is assembled with the front housing in the electronic device of FIG. 3 according to certain embodiments. Referring to FIG. 9, the metal plate 160 to which the battery 140 is attached is seated on the front housing 210. Then, the rear housing 220 is seated on the front housing 210. The screw 150 passes through the boss coupling hole 221 of the rear housing 220 and the screw coupling part 163 of the metal plate 160 and then is coupled to the boss 211 of the front housing 210. Thus, the front housing 210, the metal plate 160, and the rear housing 220 are integrated with each other. The attachment part 167 of the metal plate 160 is fitted into the opening of the rear housing 220, and a top surface of the attachment part 167 of the metal plate 160 is exposed to the outside. Here, an outer surface of the attachment part 167 of the metal plate 160 can extend without having a stepped portion with respect to an outer surface of the rear housing 220. Modules such as a UM card electrically connected to the main board 130 and a smart card and a memory module can be mounted on the rear housing 220. As described above, the coupling part 161 of the metal plate 160, i.e., the flange part 162 and the screw coupling part 163 can be covered by the rear housing 220.

Figure 10:
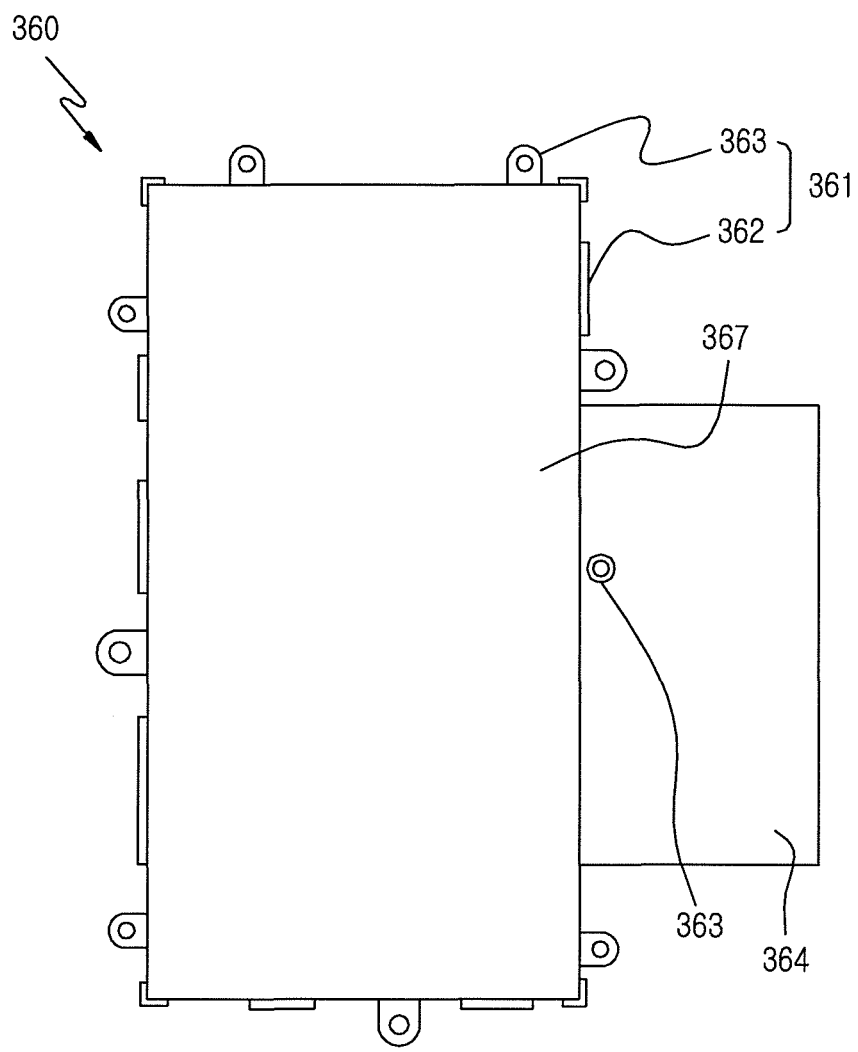
FIG. 10 is a plan view of a metal plate in the electronic device of FIG. 4 according to certain embodiments.

FIG. 10 is a plan view of a metal plate in the electronic device of FIG. 4 according to certain embodiments. Referring to FIG. 10, the metal plate 360 can have a plate shape that is molded by using a metal such as aluminum or stainless steel. The above-described metal plate 360 includes the attachment part 367 to which the battery 340 is attached and accommodating the battery 340 and the coupling part 361 extending laterally from the attachment part 367. The attachment part 367 of the metal plate 360 can provide a portion to which the battery 340 is attached. As described below, the attachment part 367 can have an uneven surface.

As described above, the coupling part 361 of the metal plate 360 includes the flange part 362 disposed between the front housing 410 and the rear housing 420 and the screw coupling part 363 fitted between the front housing 410 and the rear housing 420 and screw-coupled together with the front housing 420 and the rear housing 220. Particularly, at least one portion of the metal plate 360 extends to partially overlap the main board 330. Thus, the extension part 364 of the coupling part 361 of the metal plate 360 can prevent the noise generated from the main board 360 form leaking to the outside and prevent external the noise from being introduced into the main board 330 to prevent the noise shielding from deteriorating.

Figure 11:
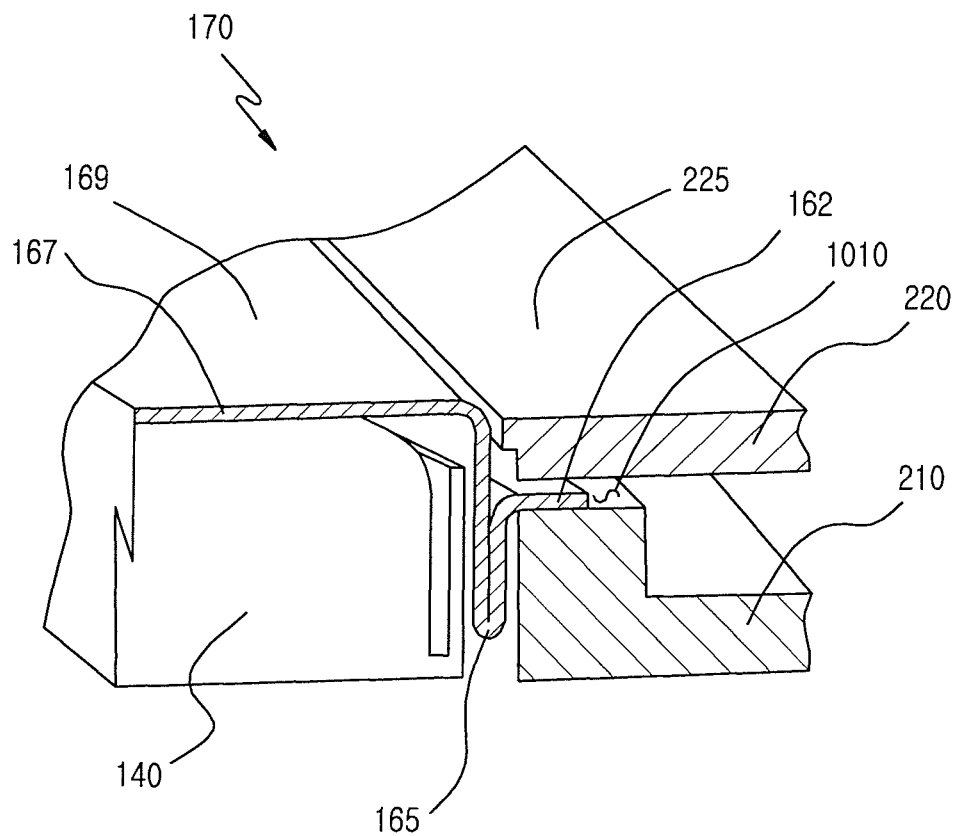
FIG. 11 is a cross-sectional view illustrating a coupling structure of a flange part with respect to a reference numeral 170 of FIG. 9.

FIG. 11 is a cross-sectional view illustrating a coupling structure of the flange part with respect to a reference numeral 170 of FIG. 9. Referring to FIG. 11, the attachment part 167 of the metal plate 160 is disposed in the opening of the rear housing 220. Here, the flange part 162 extending laterally in the method in which the circumference 165 of the attachment 167 is bent at least one time can be fitted into a space 1010 defined by the front housing 210 and the rear housing 220. The flange part 162 can be expanded up to the region for shielding the noise generated from the electronic components such as the main board 130, and thus is not limited in size and shape thereof. Also, an outer surface of the metal plate 160 and an outer surface 225 of the rear housing 220 can extend without having a stepped portion therebetween.

Figure 12:
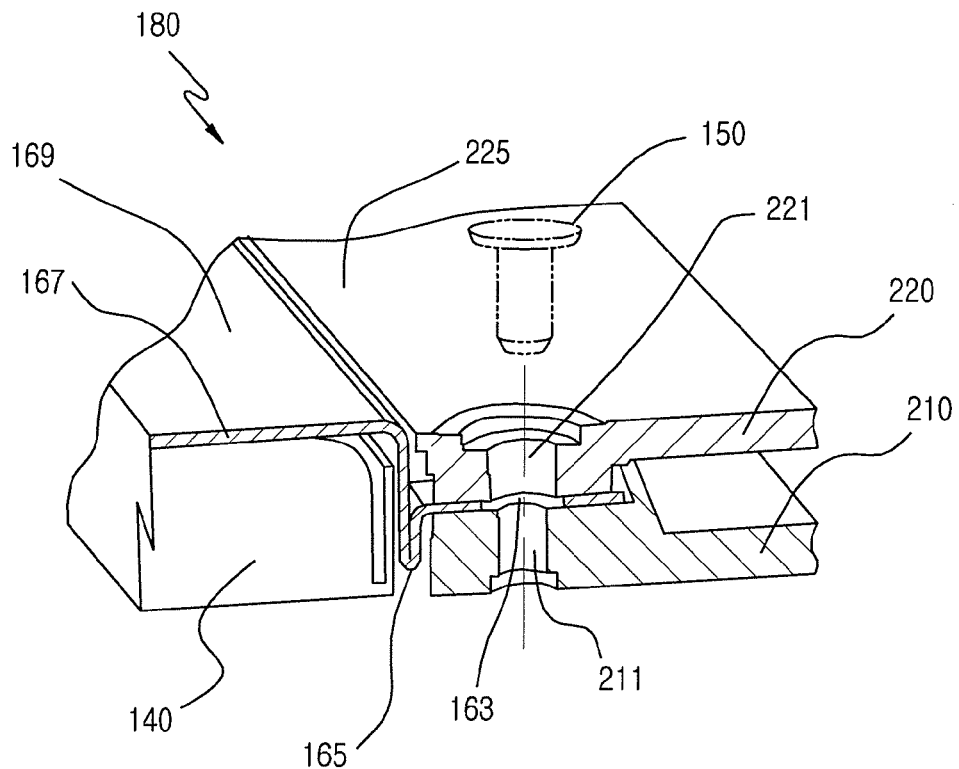
FIG. 12 is a cross-sectional view illustrating a coupling structure of a screw coupling part with respect to a reference numeral 180 of FIG. 9.

FIG. 12 is a cross-sectional view illustrating a coupling structure of the screw coupling part with respect to a reference numeral 180 of FIG. 9. Referring to FIG. 12, the attachment part 167 of the metal plate 160 is disposed in the opening of the rear housing 220. Here, the screw coupling part 163 extending laterally in the method in which the circumference 165 of the attachment 167 is bent at least one time can be fitted into a space defined by the front housing 210 and the rear housing 220. The screw 150 passes through the boss coupling hole 221 of the rear housing 220 and the screw coupling part 163 of the metal plate 160 and then is coupled to the boss 211 of the front housing 210. Thus, the front housing 210, the metal plate 160, and the rear housing 220 are integrated with each other.

Figure 13A:
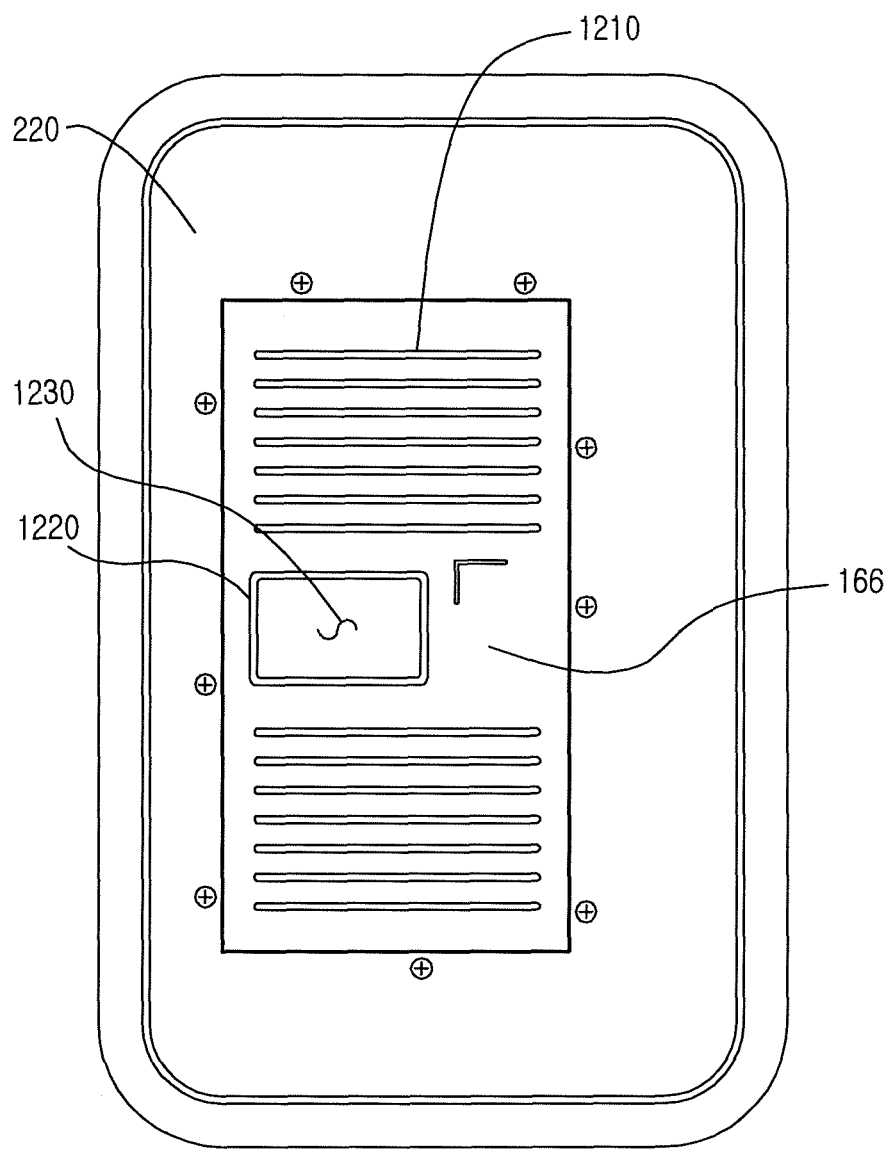
FIGS. 13A and 13B are plan views illustrating a state in which a battery cover is separated from the electronic device of FIG. 3.
Figure 13B:
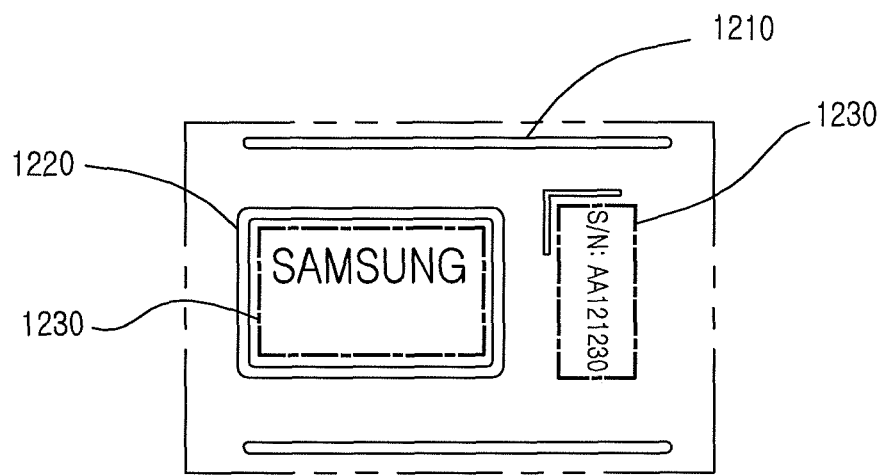

FIGS. 13A and 13B are plan views illustrating a state in which a battery cover is separated from the electronic device of FIG. 3. Referring to FIG. 13A, the attachment part 167 of the metal plate 160 is fitted into an opening 227 of the rear housing 220, and an outer surface of the attachment part 167 is exposed to the outside. The outer surface of the attachment part 167 of the metal plate 160 is uneven. Also, a protrusion 1210 and a groove 1230 can be provided on/in the outer surface of the attachment part 167. The protrusion 1210 can have an elongated shape and be provided in plurality. Here, the plurality of protrusions 1210 can have the same shape. Also, the protrusions 1210 can be regularly arranged at a predetermined distance or irregularly arranged. Also, the protrusions 1210 or the groove 1230 can have the same height or depth or have heights or depths different from each other. The protrusions 1210 and the groove 1230 can have a predetermined pattern or character to realize an elegant exterior. Also, a person skilled in the art can attach a label 1230 related to advertising or product information to the groove 1230 defined in the outer surface of the metal plate 160 (see FIG. 13B). Also, a post-processing process such as heat treatment can be performed on the metal plate 160 to secure hardness of the metal plate 160. Also, the metal plate 160 can be manufactured in consideration of color, material, and finishing to secure elegant design thereof.

Thus, since the outer surface of the metal plate 160 is uneven due to the protrusion 1210 and the groove 1230, the battery 140 can have relatively large heat dissipation area when compared to that of an even outer surface. Therefore, the battery 140 can be stabilized against heat. Also, since the protrusion 1210 prevents deformations such as dropping, bending, and twisting of the metal plate 160 from occurring, the metal plate can be reduced in peripheral thickness, and also, a bulging phenomenon of the battery 140 can be prevented.

Figure 14A:
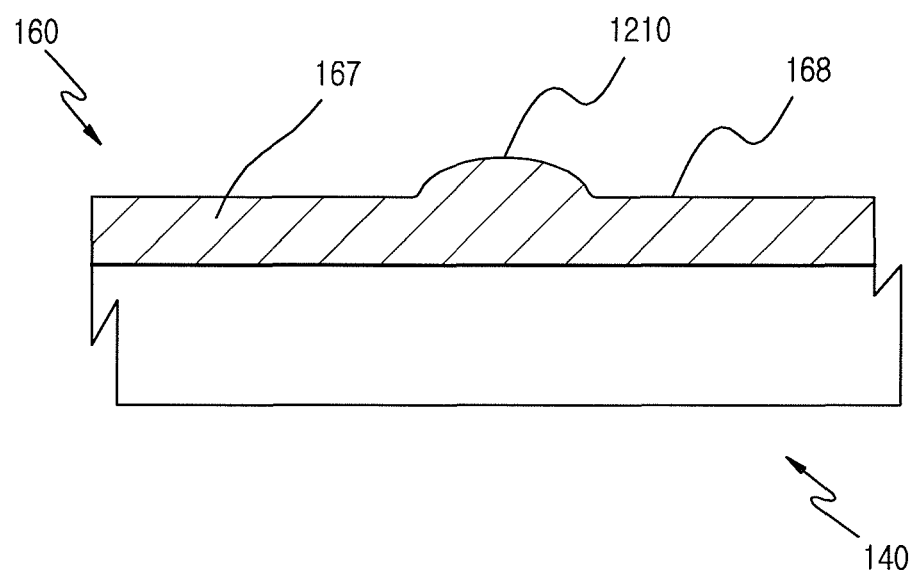
FIGS. 14A to 14C are cross-sectional views illustrating a state in which the battery is attached to the metal plate according to certain embodiments.
Figure 14B:
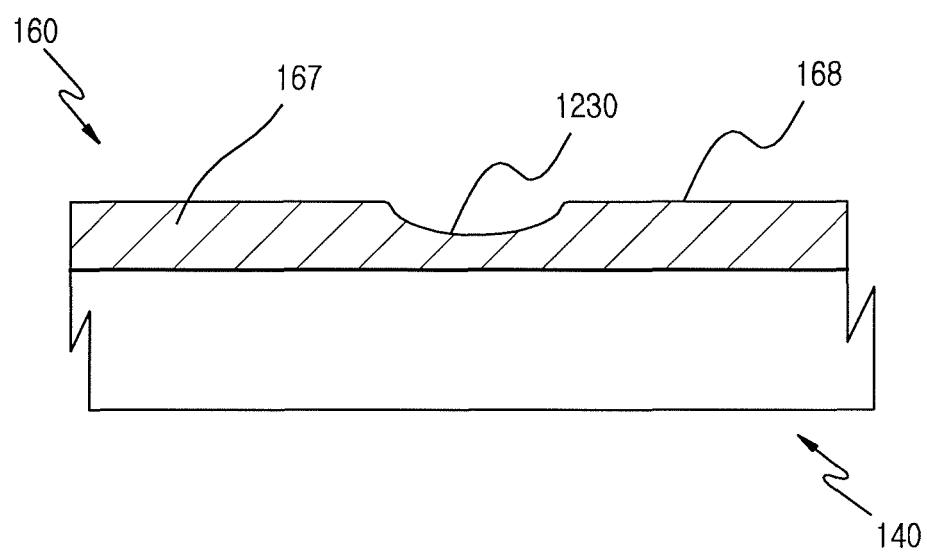
Figure 14C:
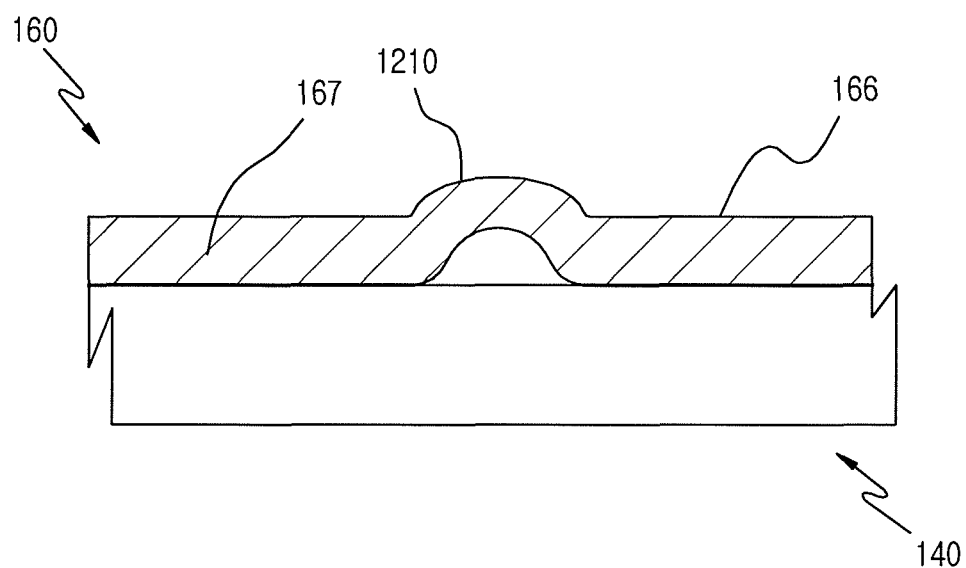
Figure 15:
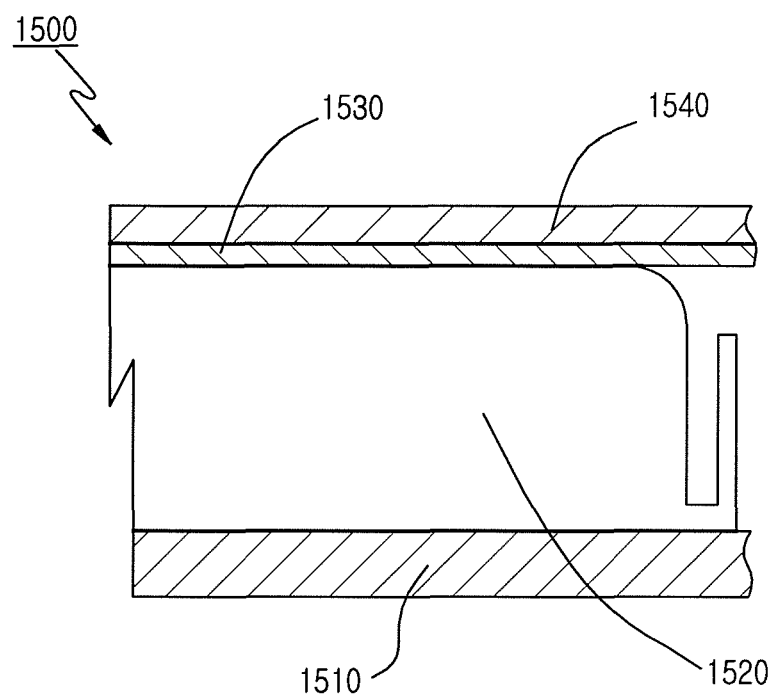
FIG. 15 is a view illustrating a battery mount structure of an electronic device according to a related art.

FIGS. 14A to 14C are cross-sectional views illustrating a state in which the battery is attached to the metal plate according to certain embodiments. Referring to FIG. 14A, the battery 140 is closely attached to the inner surface of the attachment part 167 of the metal plate 160. As described above, the protrusion 1210 disposed on the outer surface 168 of the attachment part 167 of the metal plate 160 can prevent the deformations such as the dropping, bending, and twisting of the metal plate 160 from occurring. Thus, the bulging phenomenon of the battery 140 can be prevented. Also, the outer surface 168 of the metal plate 160 can increase in area due to the protrusion 1210. Thus, heat generated from the battery 140 can be effectively dissipated to the outside.

Referring to FIG. 14B, the battery 140 is closely attached to the inner surface of the attachment part 167 of the metal plate 160. As described above, the groove 1230 defined in the outer surface 168 of the attachment part 167 of the metal plate 160 can increase in area of the outer surface 168 of the metal plate 160. Thus, the heat generated from the battery 140 can be effectively dissipated to the outside.

Referring to FIG. 14C, the protrusion 1210 disposed on the outer surface 168 of the metal plate 160 protrudes form a surrounding portion thereof and is spaced apart from the battery 140. The protrusion 1210 can effectively prevent the deformations such as the dropping, bending, and twisting of the metal plate 160 from occurring.

The present disclosure relates to the electronic device in which the battery is built. Also, to protect the battery, the metal plate is used instead of the injection-molded plastic body according to the related art. Particularly, the injection-molded plastic body according to the related art simply covers a battery. However, since the metal plate according to the present disclosure attaches the battery thereto, and the metal plate together with the battery is integrally coupled to the housing, the limitation in which other components are not freely mounted due to the battery can be solved. Also, the metal plate to which the battery is attached is firmly fixed to the housing. Here, the circumference extending laterally from the metal plate can be fitted between the housings or coupled together with the housings in the state where the circumference is fitted between the housings. According to this coupling method, the metal plate can be firmly fixed to the housings, and the metal plate and the housings can be effectively integrated with each other. Also, since the metal plate has relatively high hardness even though the metal plate has a thickness less than that of the injection-molded plastic body according to the related art, a greater slimness of the electronic device can be realized, and also, the battery can be effectively protected. Also, the metal plate can have relatively superior thermal conductivity when compared to that of the injection-molded plastic body. Thus, the heat generated from the battery can be effectively dissipated to further stabilize the battery. Also, the metal plate can effectively shield the noise generated from the electronic device or the noise introduced from the outside. Here, the metal plate can extend to overlap the electronic device, thereby shielding the noise.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
    a housing defining an exterior of the electronic device, the housing accommodating a main board, the housing comprises:
        a front housing disposed on a front side of the electronic device, and
        a rear housing disposed on a rear side of the electronic device, the rear housing comprising an upper surface coupled to the front housing;
    a metal plate coupled to the housing; and
    a battery attached to the metal plate, the battery electrically connected to and disposed parallel to the main board, wherein the battery an main board do not overlap each other,
    wherein the metal plate comprises:
        a front surface and an opposing rear surface,
        an attachment part including a recess from an upper level to a lower level, wherein the battery is disposed within the recess and attached to the front surface of the attachment part at the lower level; and
        a coupling art extending laterally from the attachment part at the upper level wherein the rear surface of the coupling part is coupled to the upper surface of the rear housing, and wherein the coupling part includes:
            an extension part that partially overlaps the main board.

2. The electronic device of claim 1, wherein the metal plate has an uneven surface.

3. The electronic device of claim 1, wherein the metal plate comprises at least one protrusion disposed on an outer surface thereof and having an elongated shape.

4. The electronic device of claim 1, wherein the metal plate has at least one groove defined in an outer surface thereof.

5. The electronic device of claim 1, wherein the metal plate is formed of one of aluminum and stainless steel.

6. The electronic device of claim 1, wherein the metal plate has an outer surface extending without having a stepped portion with respect to an outer surface of the housing.

7. The electronic device of claim 1, wherein the coupling part further comprises:
    a flange part fitted between the front housing and the rear housing.

8. The electronic device of claim 7, wherein:
    the extension part is disposed between the main board and the rear housing.

9. The electronic device of claim 8, wherein the attachment part has a container shape accommodating the battery.

10. The electronic device of claim 8, wherein the coupling part is molded in a method in which an end of a circumference of the attachment part is bent at least one time and extends laterally.

11. The electronic device of claim 8, wherein the coupling part is screw-coupled together with the front housing and the rear housing.

12. The electronic device of claim 8, wherein at least one portion of the coupling part overlaps the main board.

13. The electronic device of claim 8, wherein the rear housing has an opening in which the attachment part of the metal plate is fitted, the opening exposing the attachment part of the metal plate.

14. The electronic device of claim 13, further comprising a battery cover detachably disposed on the rear housing, the battery cover covering the metal plate when the battery cover is coupled to the rear housing.

15. The electronic device of claim 1, wherein the battery comprises a connector electrically connected to the main board.

16. The electronic device of claim 1, further comprising a touch screen stacked on the main board.

17. The electronic device of claim 16, wherein at least one portion of the metal plate overlaps the touch screen and does not overlap the main board.

* * * * *